US007002878B2

(12) United States Patent
Inui et al.

(10) Patent No.: US 7,002,878 B2
(45) Date of Patent: Feb. 21, 2006

(54) OBJECTIVE LENS DRIVING DEVICE AND OPTICAL PICKUP DEVICE USING THE SAME

(75) Inventors: Toshiharu Inui, Yamatokoriyama (JP); Shinichi Tomoyama, Yamatokoriyama (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 11/070,325

(22) Filed: Mar. 1, 2005

(65) Prior Publication Data

US 2005/0190664 A1 Sep. 1, 2005

(30) Foreign Application Priority Data

Mar. 1, 2004 (JP) ............................ 2004-056657

(51) Int. Cl.
*G11B 7/00* (2006.01)

(52) U.S. Cl. .................................................. 369/44.14

(58) Field of Classification Search ............ 369/44.12, 369/44.14, 44.15, 44.16, 44.17, 44.21, 44.18
See application file for complete search history.

(56) References Cited

U.S. PATENT DOCUMENTS 5,453,881 A 9/1995 Suzuki
6,058,095 A 5/2000 Yamamoto et al.
6,377,521 B1 * 4/2002 Kijima et al. ............ 369/44.23

FOREIGN PATENT DOCUMENTS

JP 05-225588 9/1993

* cited by examiner

*Primary Examiner*—Nabil Hindi
(74) *Attorney, Agent, or Firm*—Edwards Angell Palmer & Dodge LLP; David G. Conlin; George W. Hartnell, III

(57) ABSTRACT

An objective lens driving device includes: a movable section 8 for collecting light of a light source onto an optical disk 2; and a driving section for driving the movable section 8 (i) in a direction of a light axis of an objective lens 1 which direction is orthogonal to a storage surface of the optical disk 2 and (ii) in an in-plane direction orthogonal to the light axis, wherein the movable section 8 includes a protruding portion 4 which protrudes in a direction orthogonal to the direction of the light axis of the objective lens 1, and there is provided a stopper section 16 for restricting a movable range of the movable section 8 by coming into contact with the protruding portion 4 when the movable section 8 moves.

13 Claims, 6 Drawing Sheets

OBJECTIVE LENS DRIVING DEVICE AND OPTICAL PICKUP DEVICE USING THE SAME

This Nonprovisional application claims priority under 35 U.S.C. §119(a) on Patent Application No. 2004/056657 filed in Japan on Mar. 1, 2004, the entire contents of which are hereby incorporated by reference.

FIELD OF THE INVENTION

The present invention relates to an objective lens driving device used in an optical pickup device or the like which performs various optical processes such as storing and reproducing information with respect to a storage medium such as an optical disk or the like. More specifically, the present invention relates to (i) an objective lens driving device having restricting means for restricting a movable range of a movable section provided on the objective lens driving device and (ii) an optical pickup device having the objective lens driving device.

BACKGROUND OF THE INVENTION

Optical disks (storage media) such as CDs (Compact Disk) and DVDs (Digital Versatile Disk) are widely used to store digital information such as music information, video information, computer information, and the like. Further, with advent of a further information society, these storage media are strongly required to have higher density and larger volumes.

Further, in the optical disk, it is possible to make the storage density higher (it is possible to improve the storage capacity in each unit area) by reducing a beam spot diameter obtained from the optical pickup. A minimum diameter of the beam spot diameter is generally in proportion to $\lambda$/NA ($\lambda$ represents a wavelength of a light source used, and NA represents an aperture of an optical system) due to optical diffraction. Thus, in order to improve the storage capacity, a wavelength of a light source used is made shorter, or an aperture of an optical system of the optical pickup is made larger. It is known that the improvement of the storage capacity is realized by performing these operations.

Further, a technique in which the wavelength of the light source used is made shorter has been being made practicable by using, for example, a blue-like semiconductor laser as a light-source semiconductor laser.

Further, as a method for making the aperture of the optical system of the optical pickup larger, for example, Patent Document 1 proposes a technique in which a pair of two objective lenses is used. By using the pair of two objective lenses, it is possible to set the aperture of the optical system to 0.8 or more, so that the storage density of the optical disk can be made higher.

However, such pair of two objective lenses is required to have high accuracy in formation of each lens. Further, as to each of the two objective lenses, due to limit in terms of a formable lens shape, a working distance between a surface of the optical disk and the objective lens is extremely small such as 0.1 mm to not more than 0.3 mm. Thus, in case of using the two objective lenses, when control error (referred to as servo deviation) occurs in driving the objective lens for example, it is difficult to avoid contact between the objective lens and the optical disk. Thus, a technique is proposed in which: a protector section formed by coating or the like is provided on an end portion of a protruding portion provided on a lens holder. According to the proposed technique, the objective lens is prevented from being directly in contact with the optical disk and the protector section is in contact with the optical disk, so that it is possible to protect the objective lens and the optical disk.

Incidentally, in an optical pickup device having a conventional objective lens driving device, when any vibration or impulse is exerted with no optical disk installed into the optical pickup device, the objective lens driving device's movable section whose one side is held by an elastic support section moves. In case where strong vibration or impulse is exerted, the elastic support section which holds the movable section may be deformed.

In case where the elastic support section is deformed, when the optical disk is installed therein, a relative position of the optical disk and the objective lens provided on the movable section changes from an initial position, so that a property of the objective lens driving device may be deteriorated.

Thus, in order to solve the foregoing problem, it is necessary to prevent the deformation of the elastic support section by restricting a movable range of the movable section of the objective lens driving device by means of any stopper mechanism or the like.

Further, as a specific example of an arrangement for preventing the deformation of the elastic support section, Patent Document 2 discloses an arrangement in which: as to an optical pickup having an objective lens driving device, a cover for covering an objective lens is provided on a housing so as to be positioned on the side where the optical disk is installed. Further, in the arrangement disclosed by Patent Document 2, a movable range of a movable section of the objective lens driving device in a vertical direction (hereinafter, referred to as a focusing direction) with respect to the optical disk is restricted by bringing the cover and the movable section of the objective lens driving device into contact with each other.

As another example thereof, Patent Document 3 discloses an arrangement in which a shock absorbing member is provided on a base section 15 for movably supporting an objective lens holder. More specifically, Patent Document 3 discloses an arrangement in which: a shock absorbing member is provided on an upper end portion of a yoke member of a magnetic circuit which has been inserted into a hole of the objective lens holder. Further, according to the arrangement of Patent Document 3, when the objective lens holder is driven in a focusing direction beyond a predetermined movable range, the objective lens holder comes into contact with an undersurface of the shock absorbing member, so that its movable range is restricted.

Note that, according to the arrangements of Patent Documents 2 and 3, a working distance between a surface of the optical disk and the objective lens is large (specifically 1 mm to 1.2 mm for example), so that it is possible to provide a cover or a shock absorbing member, which restricts a movable range of the objective lens holder in a focusing direction, between the surface of the optical disk and the objective lens.

[Patent Document 1]

Japanese Unexamined Patent Publication No. 123410/1998 (Tokukaihei 10-123410)(Publication date: May 15, 1998) (corresponding to U.S. Pat. No. 6,058,095)

[Patent Document 2]

Japanese Unexamined Patent Publication No. 28510/1993 (Tokukaihei 5-28510)(Publication date: Feb. 5, 1993) (corresponding to U.S. Pat. No. 5,453,881)

[Patent Document 3]

Japanese Unexamined Patent Publication No. 225588/1993 (Tokukaihei 5-225588)(Publication date: Sep. 3, 1993)

However, each of the conventional arrangements is such that: a restricting member for controlling the movable range of the movable section is formed between the surface of the optical disk and the objective lens, so that such arrangement raises such problem that: this is not applicable to an objective lens driving device for a high-density optical disk whose working distance is small (0.1 mm to 0.3 mm for example).

Specifically, for example, the arrangement of Patent Document 2 raises the following problem. The cover is provided on the housing of the optical pickup having the objective lens driving device. Thus, when an orientation of the objective lens driving device is adjusted with respect to the housing, a positional relationship between the cover and the objective lens driving device changes every time the objective lens driving device is set, so that it is difficult to stably restrict a movable range in which the movable section moves toward the optical disk in the focusing direction.

Further, in the objective lens driving device for a high-density optical disk for example, a high servo band is required, so that it is necessary to raise a rigidity of the whole movable section including the objective lens holder. However, when the rigidity of the movable section is raised, it is difficult to provide a hole, which allows a yoke member to be inserted, on the objective lens holder, so that it is difficult to provide the yoke member on the magnetic circuit. Thus, according to the arrangement of Patent Document 3 in which the shock absorbing member is provided on the upper end portion of the yoke member, it is extremely difficult to apply such arrangement to the objective lens driving device for a high-density optical disk.

SUMMARY OF THE INVENTION

An object of the present invention is, for example, to provide (i) an objective lens driving device which favorably restricts a movable range of a movable section of the objective lens driving device even when the objective lens driving device is an objective lens driving device for a high-density optical disk whose work distance between a surface of an optical disk and an objective lens is small and (ii) an optical pickup device having the objective lens driving device.

In order to solve the foregoing problems, an objective lens driving device according to the present invention includes: an objective lens holding section for holding an objective lens which collects light of a light source onto a storage medium; and a driving section for driving the objective lens holding section in a direction of a light axis of the objective lens which direction is orthogonal to a storage surface of the storage medium and in an in-plane direction orthogonal to the light axis, and the objective lens driving device is characterized by including: a protruding portion, provided on the objective lens holding section, which protrudes in a direction orthogonal to the direction of the light axis of the objective lens; and a restricting section for restricting a movable range of the objective lens holding section by coming into contact with the protruding portion when the objective lens holding section moves.

According to the foregoing arrangement, the objective lens holding section having the protruding portion is driven, so that the protruding portion and the restricting section are brought into contact with each other when the movement of the objective lens holding section is exceeding a predetermined movable range. On this account, it is possible to restrict the movable range of the objective lens holding section within a predetermined range without fail.

Thus, for example, it is possible to restrict the movable range of the objective lens holding section without providing any restricting means such as a cover or the like between the objective lens and the storage medium unlike the conventional arrangement. Thus, for example, it is possible to realize an objective lens driving device for a high-density optical disk whose work distance between the storage medium and the objective lens is small.

For a fuller understanding of the nature and advantages of the invention, reference should be made to the ensuing detailed description taken in conjunction with the accompanying drawings.

BRIEF DESCRIPTION OF THE DRAWINGS

FIG. 4(*b*) is a side view thereof. FIG. 4(*c*) is a front view thereof.

FIG. 5(*b*) is a side view thereof.

FIG. 6(*b*) is a front view thereof. FIG. 6(*c*) is a side view thereof.

FIG. 7(*b*) is a front view thereof. FIG. 7(*c*) is a cross sectional view taken from FIG. 6(*a*).

FIG. 8(*b*) is a side view thereof. FIG. 8(*c*) is a front view thereof.

DESCRIPTION OF THE EMBODIMENTS

The following description will explain an objective lens driving device according to one embodiment of the present invention and an optical pickup device using the objective lens driving device.

The optical pickup device is a device which performs at least one of storage and reproduction of information with respect to a storage medium such as an optical disk or the like by concentrating light of a light source onto a predetermined position of the optical disk. Note that, examples of the optical disk include: a Compact Disk (CD); a Digital Versatile Disk (DVD); a Blue-ray Disk (BD); and the like.

Figure 3:
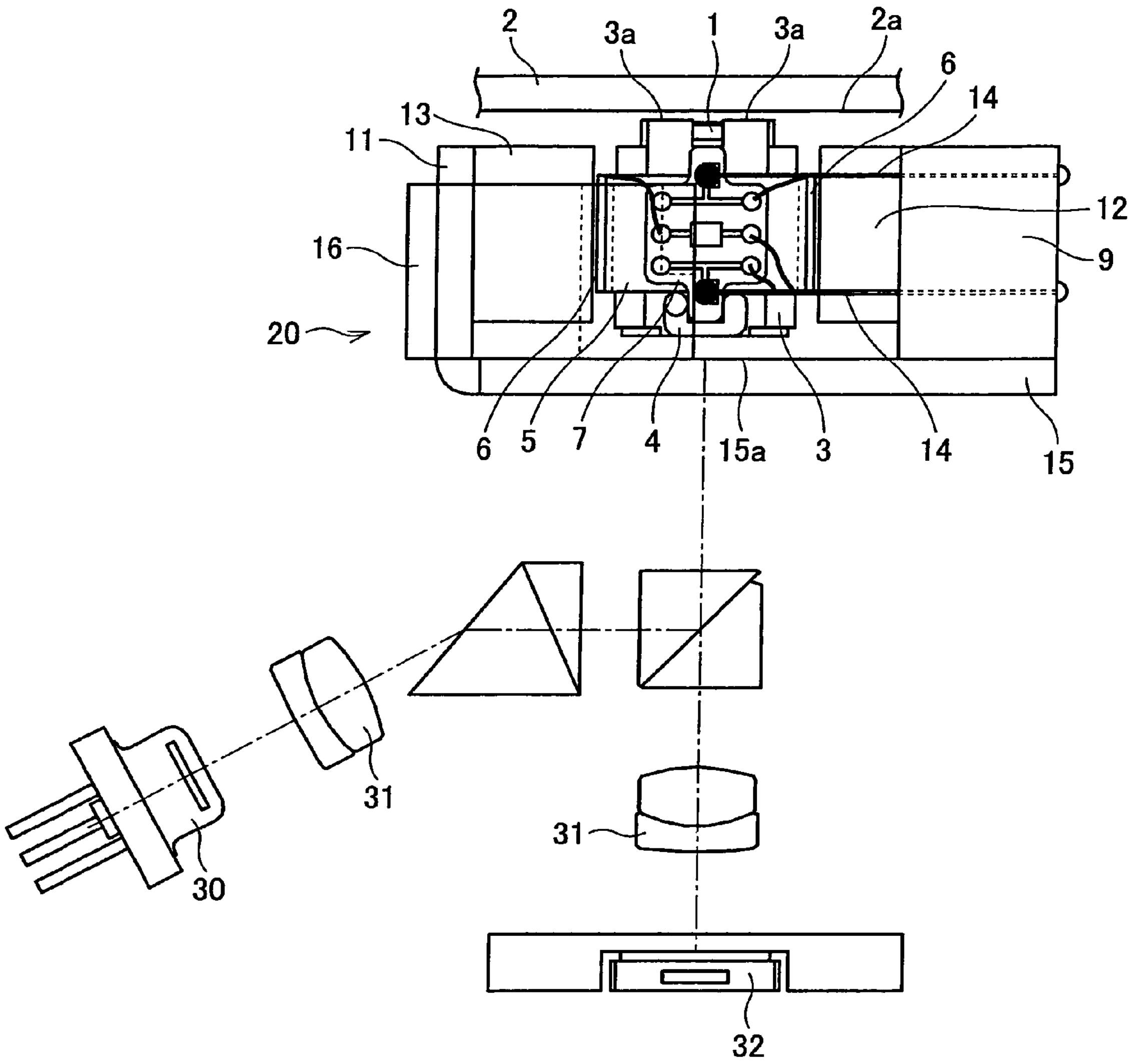
FIG. 3 is a side view schematically showing an arrangement of an optical pickup device according to one embodiment of the present invention.

FIG. 3 is a side view schematically showing an arrangement of the optical pickup device according to the present embodiment. As shown in FIG. 3, the optical pickup device includes an objective lens driving device 20, a light source 30, a light collection section (light collection means) 31, and a light detection section (light detection means) 32. The objective lens driving device 20 is a device which moves an objective lens 1 toward an optical disk 2 in a focusing direction or a tracking direction. An arrangement of the objective lens driving device 20 will be detailed later. The light source 30 emits light, specifically, a laser beam. The light collection section 31 includes not only the objective lens 1 but also a polarization beam splitter, a diffraction grating, a collimator lens, a ¼ wavelength plate, a cylindrical lens, and the like. The light collection section 31 collects a laser beam, emitted from the light source 30, onto a storage surface of the optical disk 2 via the objective lens 1. Further, the light detection section 32 has a light receiving element such as an optical sensor or the like, and detects the laser beam reflected by the optical disk 2.

The light collected onto the storage surface of the optical disk 2 is reflected by the optical disk 2, and is led to the light detection section 32. The optical pickup device controls displacement of the objective lens 1 in the focusing direction or the tracking direction in accordance with a result of detection performed by the light detection section 32 with respect to the laser beam, thereby performing at least one of storage and reproduction of information with respect to the optical disk 2.

Figure 1:
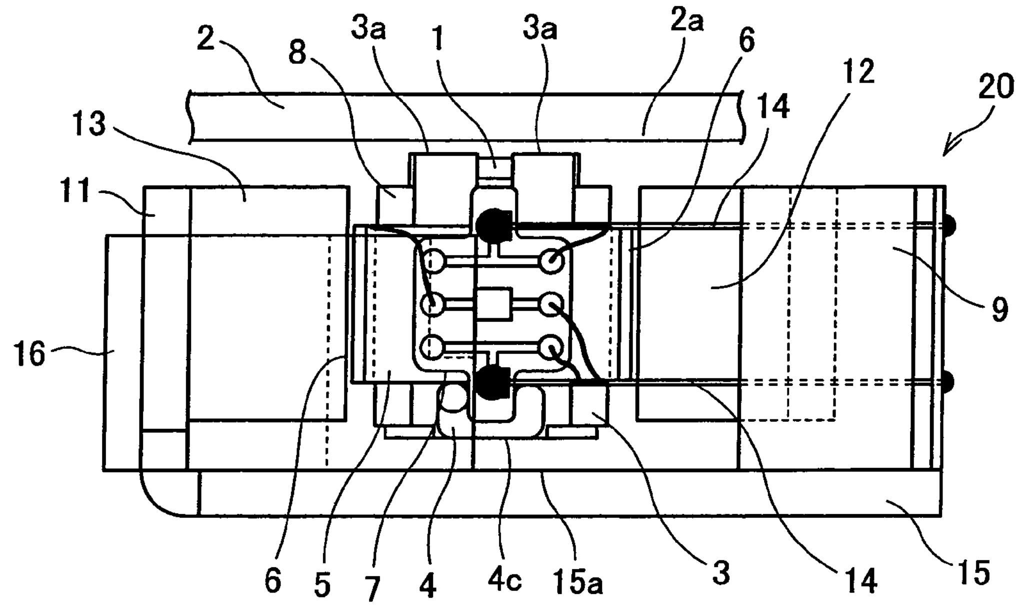
FIG. 1 is a side view schematically showing an arrangement of an objective lens driving device according to one embodiment of the present invention.
Figure 2:
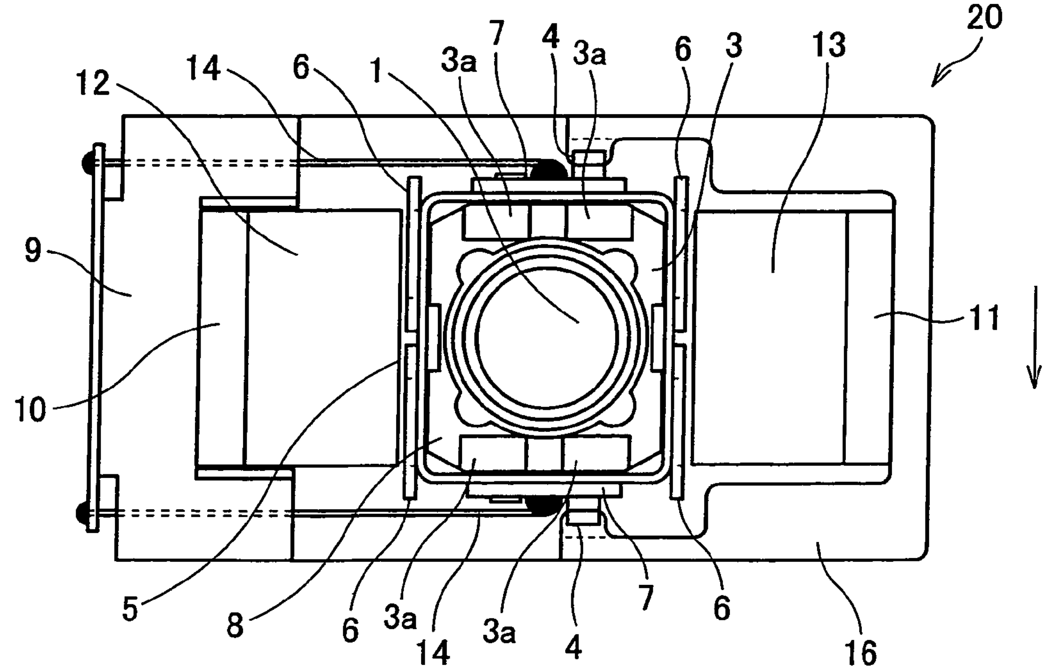
FIG. 2 is a plan view schematically showing an arrangement of the objective lens driving device according to one embodiment of the preset invention.

FIG. 1 is a side view schematically showing an arrangement of the objective lens driving device 20 according to one embodiment of the present invention, and FIG. 2 is a plan view schematically showing the arrangement of the objective lens driving device 20 according to one embodiment of the present invention. Note that, in order to facilitate the description, FIG. 2 shows the optical disk 2.

Figure 4:
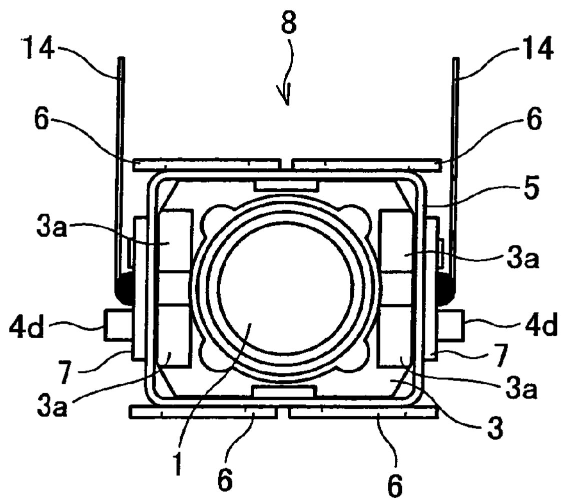
FIG. 4(*a*) is a plan view schematically showing an arrangement of a movable section of an objective lens driving device according to one embodiment of the present invention.
Figure 4:
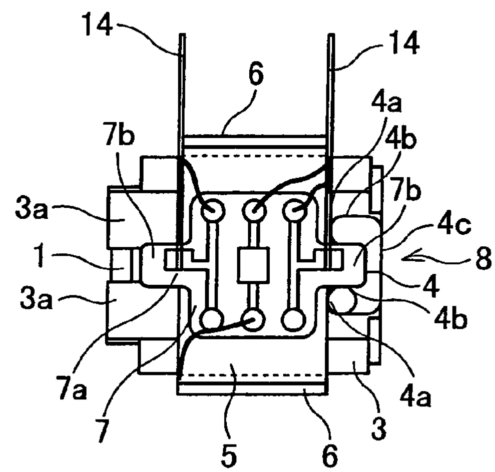
Figure 4:
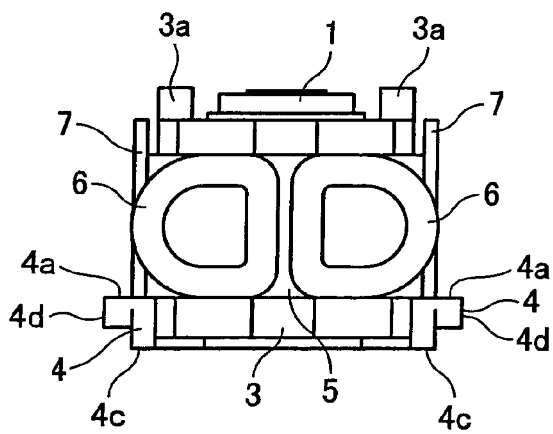

Further, FIGS. 4(*a*), 4(*b*), and 4(*c*) are respectively a plan view, a side view, and a front view, each of which schematically shows an arrangement of a vicinity of a lens holder of the objective lens driving device 20 according to one embodiment of the present invention.

Here, the focusing direction is a vertical direction with respect to the storage surface of the optical disk 2, that is, the focusing direction is an approaching or separating direction with respect to the optical disk 2. Further, the tracking direction (see an arrow in FIG. 2) is a direction parallel to a radius direction of the optical disk 2, that is, a direction parallel to the storage surface of the optical disk 2. The tracking direction is a direction in which light of the light source 30 scans the storage region of the optical disk 2 in case of reproducing information stored in the optical disk 2 or in case of storing information in the optical disk 2. In other words, the focusing direction is a light axis direction of the objective lens 1 disposed opposite to the optical disk 2, and the tracking direction is a direction orthogonal to the light axis direction of the objective lens.

As shown in FIG. 1, the objective lens driving device 20 is positioned opposite to the storage surface 2*a* of the optical disk 2 (so as to face the storage surface 2*a* of the optical disk 2). Note that, in the following description, with respect to the objective lens driving device 20, a side where the optical disk 2 is installed is an upper side, and an opposite side thereof is a lower side.

As shown in FIGS. 1 and 2, the objective lens driving device 20 according to the present embodiment includes a movable section (objective lens holding means) 8, a holding section 9 (fixing section), a first yoke 10, a second yoke 11, a first magnet 12, a second magnet 13, an elastic support member (support member) 14, a base section (fixing section, base section) 15, and a stopper section (restricting means, restricting section) 16.

Note that, the base section 15 is provided with the holding section 9, the stopper section 16, the first yoke 10, and the second yoke 11.

The elastic support member 14 is provided on the holding section 9. Further, in the elastic support member 14, an end portion opposite to an end portion connected to the holding section 9 holds a movable section 8.

The movable section 8 includes: a lens holder 3 for holding the objective lens 1; a focusing coil (driving coil) 5; a tracking coil (driving coil) 6; and the substrate 7. The movable section 8 drives the lens holder 3 having the objective lens 1 toward the storage surface 2*a* of the optical disk 2 in the focusing direction and the tracking direction.

The lens holder 3 holds the objective lens 1, being capable of finely narrowing a light beam, whose NA is large (0.8 or more for example) in order to realize high-density storage. The objective lens 1 is fixed on the lens holder 3 with adhesive such as ultraviolet ray curing adhesive or the like. Further, by moving the movable section 8, it is possible to drive the objective lens 1 toward the optical disk 2 in two directions: the focusing direction and the tracking direction. In the present embodiment, liquid crystalline polymer (LCP) is used as a material for the lens holder 3.

As shown in FIG. 1, four projections 3*a* each of which prevents the objective lens 1 and the optical disk 2 from being contact with each other are provided on an upper surface of the lens holder 3 so as to surround the objective lens 1. Further, a protector member (not shown) is formed on each projection 3*a* so as to be positioned on an surface opposite to the optical disk 2 in accordance with coating or a similar treatment. On this account, when the projection 3*a* comes in contact with the optical disk 2, it is possible to prevent the optical disk from being damaged.

In the objective lens driving device 20 according to the present embodiment, as shown in FIGS. 1 and 2, two protruding portions 4 (restricting means) protruding in the tracking direction are formed on the movable section 8 having the lens holder 3 so that each protruding portion 4 is positioned on each of two side faces (sides vertical with respect to the tracking direction). In the present embodiment, the protruding portion 4 is made of the same material as that of the lens holder 3. The protruding portion 4 will be detailed later.

The focusing coil 5 is rolled around an axis line of the objective lens 1 in the light axis direction so as to be along a periphery of the lens holder 3. Further, as to the focusing coil 5, its cross sectional surface parallel to the optical disk 2 (a plane surface orthogonal to the light axis of the objective lens 1) is substantially rectangular.

Four tracking coils 6 are provided on the focusing coil 5 so that two tracking coils 6 are positioned on each of side faces parallel to each other in the tracking direction. All the four tracking coils 6 are connected in series. Further, as shown in FIG. 4(*c*), each of the tracking coils 6 is rounded around an axis line vertical with respect to the tracking direction, that is, around an axis line parallel to a direction in which the elastic support member 14 extends. A cross sectional shape of the tracking coil 6 in a rounding axis direction is substantially D-shaped. Hereinafter, the focusing coil 5 and the tracking coil 6 are collectively referred to as a driving coil group.

Further, the driving coil group is inserted from a direction in which the objective lens 1 is installed on the lens holder 3, and is then fixed with thermosetting adhesive or the like.

Further, the substrate 7 is provided on the tracking coil 5 of the movable section 8 so as to be positioned in each of side faces vertical with respect to the tracking direction. The substrate 7 is a circuit substrate for supplying power to the driving coil group via the elastic support member 14. An end portion of the elastic support member 14 (the elastic support member 14's end portion opposite to its end portion held by the holding section 9) is mechanically and electrically connected to the substrate 7 by soldering or a similar manner. As shown in FIG. 4(*b*), a land section 7*a* which allows connection with the end portion of the elastic support member 14 is patterned on the substrate 7. Further, a convex portion 7*b* protruding toward the lower side is provided on the substrate 7 so as to be positioned in an end portion of the lower side.

While, as shown in FIGS. 1 and 2, the first yoke 10 and the second yoke 11, made of ferromagnetic material, each of which has a rectangular and flat shape, are provided on the base section 15 so as to be vertical with respect to the base section 15. Further, the first magnet 12 is provided on the first yoke 10, and the second magnet 13 is provided on the second yoke 11. Each of the first magnet 12 and the second magnet 13 is a permanent magnet piece having an N pole and an S pole in a direction orthogonal to the tracking direction. The first magnet 12 and the second magnet 13 are disposed opposite to each other with the movable section 8 therebetween. Further, the first magnet 12 and the second magnet 13 opposite to each other have surfaces opposite to each other, and both the opposite surfaces are N poles.

The elastic support member 14 connects the holding section 9 to the lens holder 3, and movably holds the movable section 8. Four elastic support members 14 are provided on the lens holder 3 so that two elastic support members 14 are positioned in each of both side faces parallel to each other in a direction orthogonal to the tracking direction. The two elastic support members 14 provided on each of the two side faces (both side faces) are disposed with an interval therebetween so as to be parallel to the focusing direction. Note that, in the present embodiment, a phosphor bronze wire whose cross sectional surface is substantially circular and diameter is about 0.1 mm is used as the elastic support member 14.

As shown in FIG. 2, the movable section 8 is held by the elastic support member 14 from the side of the holding section 9. The elasticity of the elastic support member 14 allows the movable section 8 to move with respect to the holding section 9. Further, of the four elastic support members 14, two elastic support members 14 are electrically connected to the focusing coil 5, and other two elastic support members 14 are electrically connected to the tracking coil 6. Further, voltages are applied to the focusing coil 5 and the tracking coil 6 via the elastic support members 14, thereby separately driving the focusing coil 5 and the tracking coil 6.

Specifically, in case of driving the movable section 8 in the focusing direction, a current flowing to the focusing coil 5 acts with magnetic fields of the first magnet 12 and the second magnet disposed opposite to each other, so that a driving force in the focusing direction occurs. Thus, it is possible to drive the movable section 8 in the focusing direction.

Further, in case of driving the movable section 8 in the tracking direction, currents flowing to the four tracking coils 6 connected in series act with magnetic fields of the first magnet 12 and the second magnet 13 disposed opposite to each other, a driving force in the tracking direction occurs. Thus, it is possible to drive the movable section 8 in the tracking direction.

In the objective lens driving device 20 according to the present embodiment, an end portion provided on the base section 15 so as to be positioned opposite to an end connected to the holding section 9 is provided with the stopper section 16. The stopper section 16 restricts the movable range of the movable section 8. In the present embodiment, polycarbonate (PC) is used as a material for the stopper section 16.

Here, the protruding portion 4 and the stopper section 16 of the objective lens driving device 20 of the present invention are detailed as follows.

Figure 5:
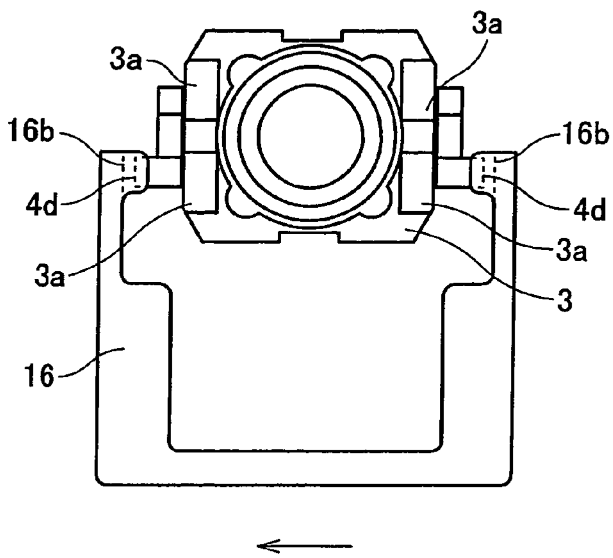
FIG. 5(*a*) is a plan view showing a lens holder and a stopper section of the objective lens driving device of the present invention.
Figure 5:
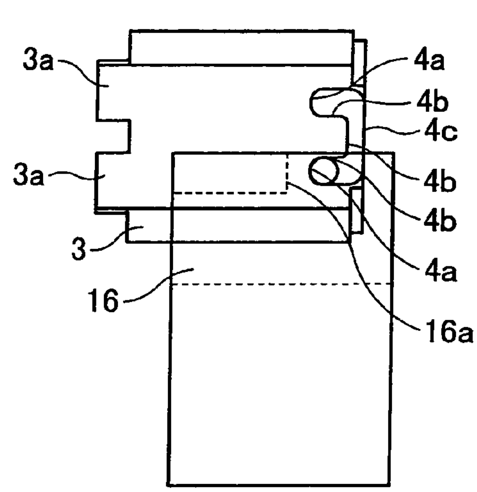

FIG. 5(*a*) is a plan view schematically showing an arrangement of the lens holder and the stopper section 16 of the objective lens driving device of the present invention, and FIG. 5(*b*) is a side view schematically showing an arrangement of the stopper section 16.

Figure 6:
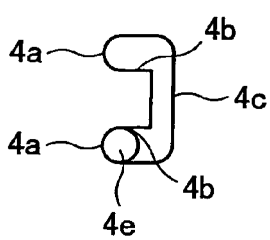
FIG. 6(*a*) is a top view schematically showing an arrangement of a protruding portion according to one embodiment of the present invention.
Figure 6:
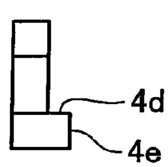
Figure 6:
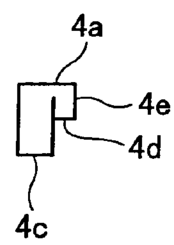

Further, FIG. 6(*a*) is a top view schematically showing an arrangement of the protruding portion 4, and FIG. 6(*b*) is a front view thereof, and FIG. 6(*c*) is a side view thereof.

Figure 7:
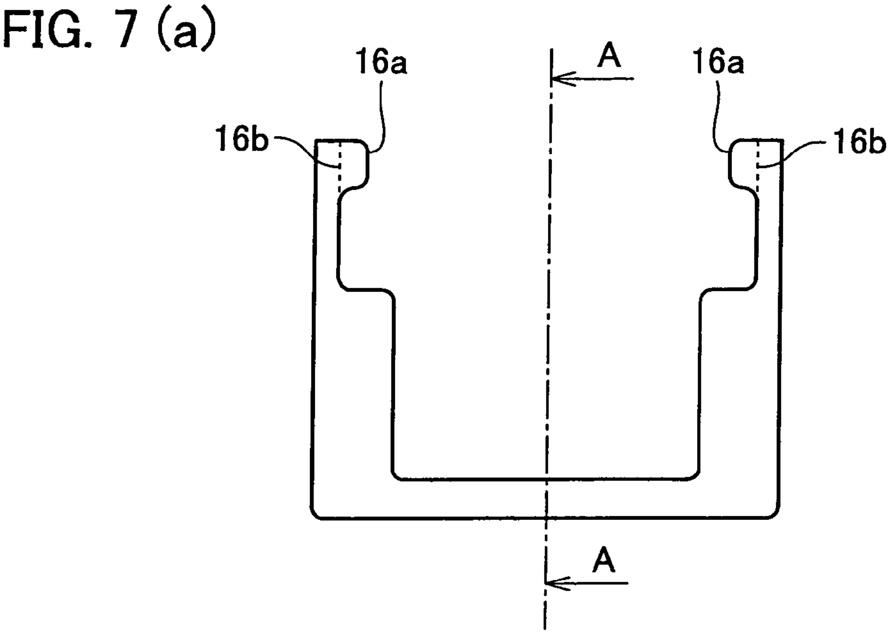
FIG. 7(*a*) is a top view schematically showing an arrangement of the stopper section.
Figure 7:
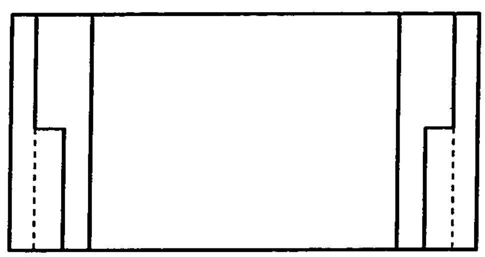
Figure 7:
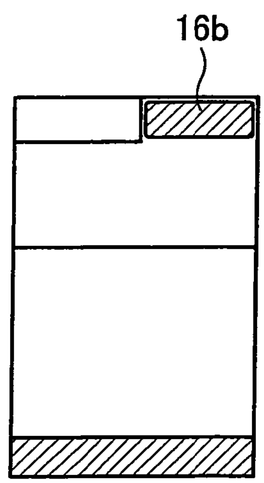

Further, FIG. 7(*a*) is a top view schematically showing an arrangement of the stopper section 16, and FIG. 7(*b*) is a front view of the stopper section 16, and FIG. 7(*c*) is a cross sectional view taken along A—A of the stopper section 16 shown in FIG. 7(*a*).

The protruding portion 4 is provided on the lens holder 3 of the movable section 8 so as to be positioned in a side face of the lens holder 3 so that the protruding portion 4 is disposed, away from a center of gravity of the whole movable section 8, in a side opposite to the objective lens holding plane, that is, in the lower side. Further, as shown in FIG. 5(*a*); a cross sectional surface of the protruding portion 4 in a direction vertical with respect to the tracking direction is substantially concaved so as to have an opening in the objective lens holding plane, that is, in the upper side. That is, as shown in FIGS. 6(*a*) to 6(*c*), a concaved portion 4*b* formed so as to concave in the lower side is provided on the protruding portion 4 according to the present embodiment. Note that, an end portion in the upper side of the protruding portion 4 is an upper surface portion 4*a*. The upper surface portion 4*a* has a U-shaped end which is parallel to the objective lens holding plane, and is a portion except for the concaved portion 4*b* of the upper surface of the protruding portion 4. Further, an end surface formed on the protruding portion 4 so as to be positioned opposite to the objective lens holding plane, that is, an end surface opposite to the base section 15 is an undersurface portion 4*c*. The undersurface portion 4*c* is formed so as to substantially correspond to an end face in the lower side of the lens holder 3. Note that, the objective lens holding plane is a surface for holding the objective lens 1 in the movable section 8, and is a surface orthogonal to the light axis direction of the objective lens 1, and is the movable section 8's surface opposite to the optical disk 2.

Further, in an end portion of the U-shaped protruding portion 4, a portion more greatly protruding in the tracking direction than any other portions is divided into a side portion 4*d* and a projecting portion 4*e*. Further, the projecting portion 4*e*'s side face in the tracking direction is a side portion 4*d*. Further, the protruding portion 4 is provided on the lens holder 3 so that the projecting portion 4*e* faces the stopper section 16.

Further, in the objective lens driving device 20 according to the present embodiment, as shown in FIG. 5(*b*) and FIGS. 7(*a*) to 7(*c*), a counter portion 16*a* is provide on an end portion which is formed on the stopper section 16 so as to be positioned in the side of the movable section 8. The counter portion 16*a* is formed on the stopper section 16 so as to be positioned upper than a position opposite to the protruding portion 4 so that the counter portion 16*a* protrudes toward the movable section 8. In view of the objective lens holding plane, the counter portion 16*a* overlaps the side portion 4*d* of the protruding portion 4 as shown in FIG. 5(*a*) and FIGS. 7(*a*) to 7(*c*).

Further, an end portion formed on the stopper section 16 as a portion other than the counter portion 16*a* so as to be positioned in the side of the movable section 8 is an end wall portion 16*b*. The end wall portion 16*b* is a side face positioned in the lower side of the counter portion 16*a* of the stopper section 16. As shown in FIG. 5(*a*) and FIGS. 7(*a*) to 7(*c*), the end wall portion 16*b* faces the projecting portion 4*e* of the protruding portion 4 with a predetermined gap therebetween. More specifically, as shown in FIG. 5(*a*), the counter portion 16*a* is a portion which is in contact with the side portion 4*d* of the protruding portion 4 provided on the movable section 8 in case where the movable section 8 is driven in the focusing direction beyond a predetermined movable range. Further, as shown in FIG. 5(*a*), the end wall portion 16*b* is a portion which is in contact with the projecting portion 4*e* of the protruding portion 4 provided on the movable section 8 in case where the movable section 8 is driven in the tracking direction beyond a predetermined movable range.

In the objective lens driving device 20 according to the present embodiment, in case where the movable section 8 is driven in the focusing direction on the side of the objective lens holding plane, that is, in case where the movable section 8 is driven to the upper side beyond a predetermined movable range, the upper surface portion 4*a* of the protruding portion 4 provided on the movable section 8 comes into contact with the counter portion 16*a*. On this account, it is possible to restrict the movable range in which the movable section 8 moves to the upper side.

Further, in case where the movable section 8 is driven in the focusing direction opposite to the objective lens holding plane, that is, in case where the movable section 8 is driven to the lower side beyond a predetermined movable range, the undersurface portion 4*c* of the protruding portion 4 comes into contact with a surface 15*a* of the base section 15. On this account, it is possible to restrict the movable range in which the movable section 8 moves to the lower side.

Further, in case where the movable section 8 is driven in the tracking direction beyond a predetermined movable range, that is, in case where the movable section 8 is driven toward the side face, the projecting portion 4*e* of the protruding portion 4 comes into contact with the end wall portion 16*b* of the stopper section 16. On this account, it is possible to restrict the movable range in which the movable section 8 moves in the tracking direction.

As described above, in the present embodiment, the stopper section 16 is disposed so that its side face is opposite to the movable section 8. Thus, it is possible to form the protruding portion 4 and the stopper section 16 so that they do not protrude from the objective lens holding plane toward the optical disk 2. Therefore, the objective lens driving device 20 can be favorably applied as an objective lens driving device for a high-density optical disk whose working distance between a surface of the optical disk 2 and the objective lens 1 is small.

Further, the stopper section 16 is provided on the base section 15. Thus, even when an orientation of the objective lens driving device 20 is adjusted with respect to a housing of the optical pickup device, a position of the stopper section 16 in the objective lens driving device does not change. That is, a positional relationship between the movable section 8 and the stopper section 16 does not change. Thus, in case where the movable section 8 is driven, it is possible to maintain the movable range of the movable section 8 in the objective lens driving device 20. Therefore, it is possible to stably drive the movable section 8, thereby improving a property of the objective lens driving device 20 as compared with the conventional arrangement.

Further, according to the present embodiment, it is possible to restrict the movable range in which the movable section 8 moves in the tracking direction and the focusing direction merely by providing the stopper section 16 and the protruding portion 4. That is, in the objective lens driving device 20 according to the present embodiment, a single member restricts the movable range in which the movable section 8 moves in the tracking direction and the focusing direction. On this account, it is not necessary to form respective stopper sections in order to restrict the movement of the movable section 8 in the focusing direction or the tracking direction unlike the conventional arrangement, so that it is possible to manufacture the objective lens driving device at lower cost.

Further, in the objective lens driving device 20 according to the present embodiment, in case of providing the driving coil group on the lens holder 3, the focusing coil 5 of the driving coil group is brought into contact with the upper surface portion 4*a* of the protruding portion 4 formed on the lens holder 3, thereby exactly position the driving coil group and the lens holder 3. That is, the protruding portion 4 not only restricts the movable range of the movable section 8 but also determines a position in which the driving coil group is provided. On this account, it is possible to prevent the property of the objective lens driving device from being deteriorated. Further, it is not necessary to use any holding tool for positioning the driving coil group, and it is possible to reduce unevenness in production thereof, so that it is possible to improve an efficiency at which the objective lens driving device is produced. Further, it is possible to cause the driving coil group to act with respect to magnetic fields of the first magnet 12 and the second magnet 13 in favorable balance.

Further, it is preferable that the protruding portion 4 is formed in a position lower than the center of gravity of the whole movable section 8, that is, the protruding portion 4 is formed on a side opposite to the objective lens holding plane. By providing the protruding portion 4 in the foregoing position, it is possible to more surely form the protruding portion 4 and the stopper section 16 so that they do not protrude from the objective lens holding plane toward the optical disk 2. Thus, it is possible to favorably apply the objective lens driving device 20 as an objective lens driving device for a high-density optical disk whose working distance between a surface of the optical disk and the objective lens.

Further, it is preferable to arrange the objective lens driving device 20 of the present invention so as to include a base section 15 which faces the movable section 8 from a side opposite to the objective lens holding plane, wherein the undersurface portion 4*c* of the protruding portion 4 is formed so as to substantially correspond to an end face positioned in the side opposite to the objective lens holding plane.

According to the foregoing arrangement, when the movable section 8 is driven toward the side opposite to the objective lens holding plane beyond a predetermined movable range, the undersurface portion 4*c* of the protruding portion 4 of the movable section 8 comes into contact with the base section 15, so that it is possible to restrict the movable range in which the movable section 8 moves toward the side opposite to the objective lens holding plane. Thus, it is not necessary to form the counter portion 16*a* into a shape for restricting the movable range in which the movable section 8 moves toward the side opposite to the objective lens holding plane, and it is not necessary to provide another stopper section for restricting the movable range in which the movable section 8 moves toward the side opposite to the objective lens holding plane. On this account, it is possible to simplify a shape of the stopper section 16. Further, it is possible to prevent a force from being concentrated only on the protruding portion 4.

Further, in the substrate 7 of the objective lens driving device 20, the land section 7*a* which allows electrical connection with the elastic support member 14 is patterned. Generally, in case of positioning the elastic support member 14 in the substrate 7, a holding tool is used. However, when positional deviation between the substrate 7 and the movable section 8 occurs, four elastic support members 14 are different from each other in terms of a free length from a connection point between the land section 7*a* and each elastic support member 14. In this case, unevenness occurs in a spring constant of each elastic support member 14. Further, when the movable section 8 is driven under such condition, a moment occurs and the movable section 8 tilts with respect to the optical disk 2, so that it is difficult to store and reproduce information particularly with respect to a high-density optical disk 2. Thus, it is necessary to exactly position the substrate 7 with respect to the lens holder 3. Thus, in the objective lens driving device 20 of the present invention, the protruding portion 4 has the concaved portion 4*b* formed on the side opposite to a direction which faces the substrate 7 (substrate for supplying power to the driving coil group on the side face of the objective lens holder 3), and the substrate 7 has the convex portion 7*b* which can be fitted in (can be in contact with) the concaved portion 4*b*. Further, in case of providing the substrate 7 on the movable section 8, the convex portion 7*b* of the substrate 7 is fitted into the concaved portion 4*b* of the protruding portion 4. On this account, it is possible to exactly position the substrate 7 with respect to the lens holder 3. Thus, it is possible to more surely suppress the tilt of the objective lens 1 with respect to the optical disk 2, so that it is possible to prevent the property of the objective lens driving device from being deteriorated. Further, it is not necessary to use any holding tool for exactly positioning the substrate 7 and the lens holder 3, and it is possible to improve an efficiency at which the objective lens driving device 20 is produced.

Note that, in the present embodiment, a distance between the upper surface portion 4*a* of the protruding portion 4 and the stopper section 16*a* is set to 0.8 mm, and also a distance between the surface 15*a* of the base section 15 and the undersurface portion 4*c* of the protruding portion 4 is set to 0.8 mm. Further, a distance between the end wall portion 16*b* and the projecting portion 4*e* of the protruding portion 4 is set to 0.3 mm. Further, the movable range of the movable section 8 does not depend on the working distance, but is set in accordance with a disk physical standard (disk surface fluctuation quantity ±0.3 mm) and storage/reproduction device mechanical accuracy (error in production, error in part sizes).

As described above, the objective lens driving device according to the present embodiment includes: a movable section 8 having a lens holder 3 for holding an objective lens 1 for collecting light of a light source onto an optical disk 2; and a driving section for driving the movable section 8 in a direction of a light axis of the objective lens 1 which direction is orthogonal to a storage surface of the optical disk 2 and in an in-plane direction orthogonal to the light axis, wherein a restricting member for restricting a movable range of the movable section 8 is provided in a direction orthogonal to the light axis of the objective lens 1.

More specifically, the objective lens driving device 20 according to the present embodiment is arranged so that: the restricting member includes: a protruding portion, provided on the movable section 8, which protrudes in the direction orthogonal to the light axis of the objective lens 1; and a stopper section 16 for restricting the movable range of the movable section 8 by coming into contact with the protruding portion 4 when the movable section 8 moves.

According to the foregoing arrangement, the restricting member is provided in a direction orthogonal to the light axis. That is, it is possible to restrict the movement of the movable section 8 from a direction parallel to the storage surface of the storage medium.

On this account, for example, it is possible to restrict the movable range of the movable section 8 without providing any restricting means such as a cover between the objective lens 1 and the optical disk 2 unlike the conventional arrangement. Thus, for example, it is possible to realize an objective lens driving device for a high-density optical disk whose working distance between the optical disk 2 and the objective lens 1 is small.

Further, according to the foregoing arrangement, the movable section 8 having the protruding portion 4 is driven, so that the protruding portion 4 and the stopper section 16 are brought into contact with each other when its movable range is exceeding a predetermined movable range. On this account, it is possible to restrict the movable range of the movable section 8 within a predetermined range without fail.

Further, the stopper section 16 allows the movable range of the movable section 8 to be restricted, so that it is possible to prevent plastic deformation of the elastic support member 14 even when the movable section 8 is driven beyond the predetermined movable range. Therefore, in case of installing the optical disk 2 in the information storage/reproduction device having the objective lens driving device 20, it is possible to prevent the property deterioration of the objective lens driving device 20 which is caused by the tilt of the objective lens 1, held by the elastic support member 14, with respect to the optical disk 2.

Further, the optical pickup device of the present embodiment includes: the foregoing objective lens driving device 20; a light source for emitting light; a light collection section for collecting light of the light source onto the optical disk; and a light detection section for detecting the light that has been collected by the light collection section and has been reflected by the optical disk.

According to the foregoing arrangement, the stopper section 16 disposed so that its side face is opposite to the movable section 8 allows the movable range of the movable section 8 to be restricted, so that it is possible to favorably apply the optical pickup device as an optical pickup device for a high-density optical disk whose working distance between the optical disk 2 and the objective lens 1 is small.

Note that, the foregoing embodiment described an example where the protruding portion 4 formed on the lens holder 3 has a substantially U-shaped cross sectional surface in parallel to the focusing direction. However, a shape of the protruding portion 4 is not limited to the foregoing shape, and any shape can be formed as long as the movable range of the movable section 8 is restricted. That is, in the foregoing embodiment, the protruding portion 4 functions as a positioning member for positioning the substrate 7 and the driving coil group, but the protruding portion 4 may function in any manner as long as the protruding portion 4 restricts the movable range of the movable section 8. That is, the protruding portion 4 may be constituted merely of the side face portion 4*d* and the projecting portion 4*e* each of which protrudes toward the stopper section 16. Note that, it is needless to say that the protruding portion 4 functions as a positioning member for further positioning the substrate 7 and the driving coil group. Further, the number of the protruding portions 4 and a material for each protruding portion 4 are not limited.

Further, a shape of the stopper section 16 is not limited to the foregoing shape. Specifically, a shape of the counter portion 16*a* of the stopper section 16 may be a shape which allows the counter portion 16*a* to be fit into the side face portion 4*d* and the projecting portion 4*e* of the protruding portion 4. In this case, a distance between the projecting portion 4*e* and the end wall portion 16*d* is a movable distance in which the movable section 8 moves in the tracking direction.

Further, the foregoing description explained an example where the undersurface portion 4*c* substantially corresponds to an end face in the lower side of the lens holder 3. However, for example, it may be so arranged that: the undersurface portion 4*c* is provided lower than the end face in the lower side of the lens holder 3, that is, the undersurface portion 4*c* is provided so that the protruding portion 4 protrudes toward the base section 15. In this case, the lens holder 3 is not directly in contact with the base section 15.

Further, in the present embodiment, polycarbonate (PC) is used as a material for the stopper section 16, but the material is not limited to this. Any material may be used as long as the material is preferable in terms of the size accuracy and the material enables the cost to be reduced, and other material such as ABS or the like can be used. Further, a shape and a material of the counter portion 16*a* disposed on the stopper section 16 are not limited to the foregoing embodiment, and the number and positions of the counter portions 16*a* are not limited to the foregoing embodiment. The counter portion 16*a* may be arranged in any manner as long as the counter portion 16*a* comes into contact with the protruding portion 4 so as to restrict the movable range of the movable section 8 when the movable section 8 is driven beyond a predetermined movable range.

Further, in the present embodiment, liquid crystalline polymer (LCP) is used as a material for the lens holder 3, but the material for the lens holder 3 is not limited to this. Any material may be used as long as the material can effectively cancel the vibration exerted from the outside of the movable section 8, that is, as long as the material is superior in a damping property. Further, it is general that the protruding portion 4 is formed at the same time as formation of the lens holder 3, so that a material thereof is the same as the material for the lens holder 3. As the material for the protruding portion 4 and the lens holder 3, it is more preferable to use a material whose size accuracy is about ±0.03 mm. Note that, in case of separately forming the lens holder 3 and the protruding portion 4, materials thereof may be different from each other.

Note that, shapes, materials, the number, and positions of the projections 3*a* provided on the lens holder 3 are not limited to those mentioned in the foregoing description.

Further, as a coating material applied to the projection 3*a* so as to be positioned in a surface opposite to the optical disk 2, it is preferable to use a material having elasticity. This prevents the optical disk 2 from being damaged even when the coating material comes into contact with the optical disk 2. Further, as the coating material, it is preferable to use a material whose friction coefficient is low. This prevents sticking between the coating material and the optical disk 2 at the time of contact from deforming the elastic support member 14 which holds the movable section 8. Thus, it is possible to prevent the positional deviation of the movable section 8 which is caused by the deformation of the elastic support member 14, thereby preventing deviation or the like of the light axis from a position adjusted in the objective lens 1.

[Embodiment 2]

The following description will explain another embodiment of the present invention. Note that, in order to facilitate the description, the same reference signs are given to members having the same functions as members described in Embodiment 1, and description thereof is omitted.

Figure 8:
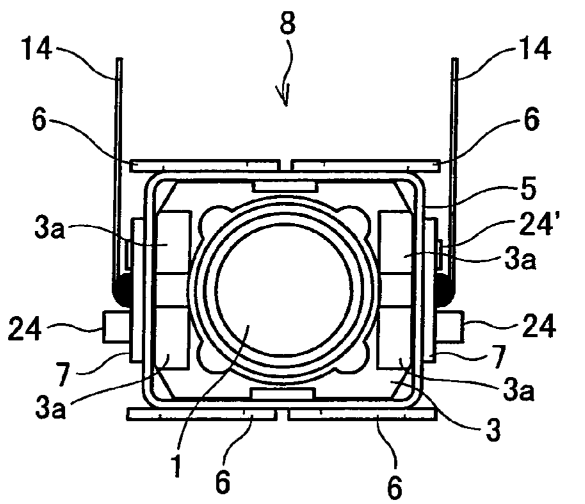
FIG. 8(*a*) is a plan view schematically showing an arrangement of a movable section of an objective lens driving device according to another embodiment of the present invention.
Figure 8:
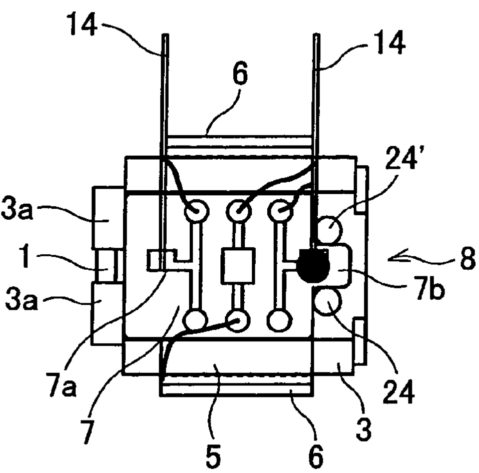
Figure 8:
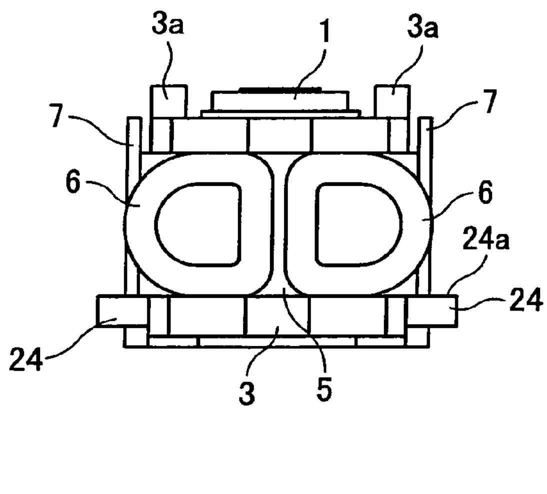

In the present embodiment, another shape of the protruding portion will be described. FIGS. 8(*a*), 8(*b*), and 8(*c*) are respectively a plan view, a side view, and a front view, each of which schematically shows an arrangement of a movable section 8 of an objective lens driving device according to another embodiment of the present invention.

As shown in FIGS. 8(*a*) to 8(*c*), the movable section 8 according to the present embodiment is arranged in the same manner as in the movable section 8 shown in FIG. 4 except that: two cylindrical protruding portions 24 and 24' are provided on the lens holder 3 so as to be positioned in each side face instead of the protruding portions 4 each having a substantially concaved portion. Each of the protruding portions 24 and 24' has a substantially circular cross sectional surface which is vertical in the tracking direction.

Here, end portions in the upper side of the protruding portions 24 and 24' are upper surface portions 24*a* and 24*a'*. As shown in FIG. 8(*a*), the protruding portion 24 is formed so as to protrude from the lens holder 3 more greatly than the protruding portion 24'. On this account, the stopper section 16 has only to face mere the protruding portion 24, so that it is possible to simplify a shape of the protruding portion of the lens holder 3. Also in the present embodiment, the focusing coil 5 is brought into contact with the upper surface portions 24*a* and 24*a'*, so that it is possible to exactly position the focusing coil 5 with respect to the lens holder 3 in case of setting the focusing coil 5 in the lens holder 3. Further, the convex portion 7*b* of the substrate 7 is fitted between the protruding portions 24 and 24' that are provided on each side face of the lens holder 3, thereby positioning the substrate 7 with respect to the lens holder 3. On this account, it is not necessary to use any holding tool for exactly positioning the focusing coil 5 or the substrate 7 with respect to the lens holder 3.

According to the foregoing arrangement, compared with the case where the shape of the protruding portion is a substantially concaved shape, it is possible to more easily produce the protruding portion 24 since the shapes of the protruding portions 24 and 24' are simplified. Further, it is possible to make the protruding portions 24 and 24' smaller, so that the movable section 8 can be made lighter. On this account, it is possible to stably drive the movable section 8.

Note that, the foregoing description explained an example where the protruding portions 24 and 24' are used. However, in case of restricting only the movable range of the movable section, it may be so arranged that only the protruding portion 24 which protrudes from the movable section 8 toward the stopper section 16 is provided. That is, in the foregoing description, each of the protruding portions 24 and 24' not only restricts the movable range of the movable section but also functions as a positioning member for positioning the substrate 7 and the driving coil group. Thus, mere restriction of the movable range of the movable section 8 requires only the protruding portion 24.

As described above, an objective lens driving device according to the present invention includes: objective lens holding means for holding an objective lens which collects light of a light source onto a storage medium; and driving means for driving the objective lens holding means in a direction of a light axis of the objective lens which direction is orthogonal to a storage surface of the storage medium and in an in-plane direction orthogonal to the light axis, and the objective lens driving device is characterized by including: a protruding portion, provided on the objective lens holding section, which protrudes in a direction orthogonal to the direction of the light axis of the objective lens; and a restricting section for restricting a movable range of the objective lens holding section by coming into contact with the protruding portion when the objective lens holding section moves.

According to the foregoing arrangement, the objective lens holding means having the protruding portion is driven, so that the protruding portion and the restricting section are brought into contact with each other when the movement of the objective lens holding means is exceeding a predetermined movable range. On this account, it is possible to restrict the movable range of the objective lens holding means within a predetermined range without fail.

Thus, for example, it is possible to restrict the movable range of the objective lens holding means without providing any restricting means such as a cover or the like between the objective lens and the storage medium unlike the conventional arrangement. Thus, for example, it is possible to realize an objective lens driving device for a high-density optical disk whose work distance between the storage medium and the objective lens is small.

It is preferable to arrange the objective lens driving device according to the present invention so that: the protruding portion is positioned further than a center of gravity of the objective lens holding means in view of an objective lens holding plane in which the objective lens is held by the objective lens holding means.

According to the foregoing arrangement, the protruding portion is positioned farther than the center of gravity of the objective lens holding means in view of the objective lens holding plane. That is, the protruding portion is positioned away from the objective lens. On this account, it is possible to prevent the protruding portion from being positioned nearer to the storage medium than the objective lens. Thus, it is possible to favorably adopt the technique to an objective lens driving device for a high-density optical disk whose working distance between the storage medium and the objective lens is small.

It is preferable to arrange the objective lens driving device according to the present invention so that: the protruding portion is formed so that a same plane is constituted of: a side face of the protruding portion; and an end face of the objective lens holding means which end face is a rear side with respect to the objective lens holding plane.

According to the foregoing arrangement, the protruding portion is provided so that a side face of the protruding portion constitutes a plane surface which is an end surface opposite to the objective lens holding plane. That is, the end surface provided on the objective lens holding means so as to positioned opposite to the objective lens holding plane is a plane surface. Thus, when the objective lens holding means moves in a light axis direction of the objective lens, the objective lens holding means comes into contact with the restricting section in the same plane surface of the protruding portion and the objective lens holding means. Thus, both the protruding portion and the objective lens holding means enable the movable range of the objective lens holding means to be restricted. On this account, it is possible to prevent a force from concentrating only on the protruding portion.

It is preferable to arrange the objective lens driving device according to the present invention so that: the driving section includes: a coil, provided on the objective lens holding means, in which a current flows; and a magnet which causes a magnetic field to act with respect to the coil, and the protruding portion is in contact with the coil.

The driving means includes a coil and a magnet, so that electromagnetic induction causes the objective lens to be driven.

According to the foregoing arrangement, the coil is in contact with the protruding portion. Thus, in case of providing the coil on the objective lens holding means for example, it is possible to provide the coil in a predetermined position by bringing the coil into contact with the protruding portion.

It is preferable to arrange the objective lens driving device according to the present invention so that: the objective lens holding section includes a substrate for supplying power to the coil, and the protruding portion includes a positioning section for positioning the substrate with respect to the objective lens holding section, and the substrate and the positioning section are in contact with each other.

According to the foregoing arrangement, the substrate and the positioning section are in contact with each other. On this account, in case of providing the substrate on the objective lens holding means for example, it is possible to provide the substrate in a predetermined position by bringing the substrate into contact with the positioning section. That is, in case of providing the substrate on the objective lens holding means, it is possible to more easily position the substrate.

An optical pickup device according to the present invention includes the foregoing objective lens driving device.

Thus, it is possible to provide an optical pickup for a high-density optical disk whose working distance between the storage medium and the objective lens is small.

The objective lens driving device of the present invention is provided on an optical pickup device, and stores and reproduces information in and from various storage media such as CDs, DVDs, and the like, so that it is possible to use the objective lens driving device in an information storage/reproduction device which performs storage or the like of digital information such as music information, video information, computer information, and the like. Further, the objective lens driving device of the present invention can be favorably used particularly in an information storage/reproduction device for a high-density optical disk whose working distance between an optical disk and an objective lens is small.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An objective lens driving device, comprising:

an objective lens holding section for holding an objective lens which collects light of a light source onto a storage medium;

a driving section for driving the objective lens holding section in a direction of a light axis of the objective lens which direction is orthogonal to a storage surface of the storage medium and in an in-plane direction orthogonal to the light axis;

a protruding portion, provided on the objective lens holding, which protrudes in a direction orthogonal to the direction of the light axis of the objective lens section; and a restricting section for restricting a movable range of the objective lens holding section by coming into contact with the protruding portion when the objective lens holding section moves.

2. The objective lens driving device as set forth in claim 1, wherein the protruding portion is positioned further than a center of gravity of the objective lens holding section in view of an objective lens holding plane in which the objective lens is held by the objective lens holding section.

3. The objective lens driving device as set forth in claim 1, wherein the protruding portion is formed so that a same plane is constituted of: a side face of the protruding portion; and an end face of the objective lens holding section which end face is a rear side with respect to the objective lens holding plane.

4. The objective lens driving device as set forth in claim 1, wherein the driving section includes: a coil, provided on the objective lens holding section, in which a current flows; and a magnet which causes a magnetic field to act with respect to the coil, and the protruding portion is in contact with the coil.

5. The objective lens driving device as set forth in claim 4, wherein:

the objective lens holding section includes a substrate for supplying power to the coil, and the protruding portion includes a positioning section for positioning the substrate with respect to the objective lens holding section, and the substrate and the positioning section are in contact with each other.

6. The objective lens driving device as set forth in claim 1, wherein the protruding portion has a cylindrical shape.

7. The objective lens driving device as set forth in claim 1, wherein the protruding portion and the objective lens holding section are integrally formed.

8. The objective lens driving device as set forth in claim 1, wherein the restricting section restricts movement of the objective lens holding section in a focusing direction and a tracking direction.

9. An optical pickup device, comprising an objective lens driving device which includes:

an objective lens holding section for holding an objective lens which collects light of a light source onto a storage medium;

a driving section for driving the objective lens holding section in a direction of a light axis of the objective lens which direction is orthogonal to a storage surface of the storage medium and in an in-plane direction orthogonal to the light axis;

a protruding portion, provided on the objective lens holding section, which protrudes in a direction orthogonal to the direction of the light axis of the objective lens; and a restricting section for restricting a movable range of the objective lens holding section by coming into contact with the protruding portion when the objective lens holding section moves.

10. The objective lens driving device as set forth in claim 1, wherein the restricting section is moveable relative to the protruding portion.

11. The objective lens driving device as set forth in claim 1, wherein the protruding portion prevents the objective lens from contacting the storage surface of the storage medium.

12. The optical pickup device as set forth in claim 9, wherein the restricting section is moveable relative to the protruding portion.

13. The optical pickup device as set forth in claim 9, wherein the protruding portion prevents the objective lens from contacting the storage surface of the storage medium.

* * * * *